July 19, 1938.  F. A. BEIK  2,124,101
METHOD FOR FUSING BORATES
Filed March 25, 1937  3 Sheets—Sheet 1

Inventor
Frederick A. Beik
By
Attorney

July 19, 1938.  F. A. BEIK  2,124,101
METHOD FOR FUSING BORATES
Filed March 25, 1937   3 Sheets-Sheet 3

Inventor
Frederick A. Beik
By
Attorney

Patented July 19, 1938

2,124,101

UNITED STATES PATENT OFFICE 2,124,101

METHOD FOR FUSING BORATES

Frederick A. Beik, Long Beach, Calif., assignor to Pacific Coast Borax Company, a corporation of Nevada Application March 25, 1937, Serial No. 133,066

12 Claims. (Cl. 23—59)

This application is a continuation in part of my co-pending application, Serial No. 753,881, filed November 20, 1934.

This invention relates in a general way to fusing operations and is more particularly related to improvements in the method and apparatus for fusing materials such as sodium borate which, in the hot molten state, react or unite with the linings of the furnaces with which they come in contact.

It is well known to those familiar with the art that the manufacture of an ordinary fused sodium tetraborate, for example, (such as borax glass) subjects the walls and linings of furnaces in which the material is fused to a rapid deterioration due to the chemical action of such material in the hot molten condition. This is not only a source of considerable maintenance expense in the production of such material but it is also a source of considerable contamination of the product with undesirable impurities.

It therefore becomes a primary object of this invention to provide a method and apparatus for fusing materials of the class described in which there is no contact between the fused material and the furnace lining or the surface which supports the fused material.

It is a further object of this invention to provide a process and apparatus of the class described which is adapted for continuous operation and in which the rate of feed of the raw material is automatically controlled.

The process and apparatus contemplated by this invention have been especially designed for producing fused minerals of sodium tetraborate, such as Rasorite and Tincal in the first place, but the process can likewise be applied to refined boron compounds especially refined borax and furthermore to partially refined hydrates of sodium tetraborate ($Na_2B_4O_7$) or a calcined product resulting from the dehydration or partial dehydration of such hydrates; and in this connection I have discovered that fused sodium tetraborate produced by the process of this invention, although harder than calcined or unfused borax, is much more friable and therefore more easily pulverized than fused borax, such as borax glass, produced in the conventional manner.

The details in the process and one preferred form of apparatus for practicing the same, together with other objects attending its production, will be best understood from the following description of the accompanying drawings, which are chosen for illustrative purposes only, and in which—

Figure 1:
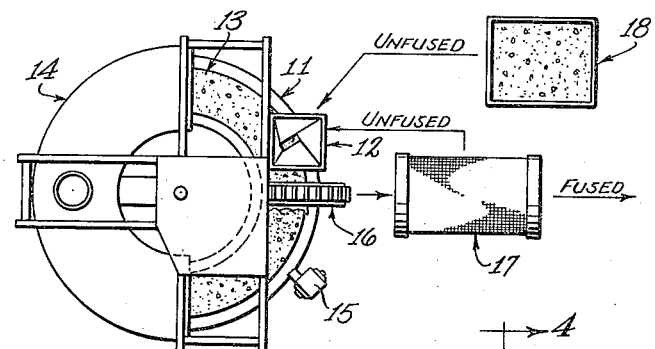
Fig. 1 is a plan view of a diagrammatic nature which illustrates the process contemplated by this invention.

For the purpose of accomplishing the objects of my invention enumerated above, I propose to continuously deposit the material to be fused upon a traveling surface such as a rotating table member. The bed of material, including hydrated borates, so deposited is carried by means of the traveling surface through a furnace or heating zone and the temperature of the furnace, together with the linear speed of travel of the surface, are controlled or regulated so that only an upper layer of the bed of material is fused during its passage through the heating zone. In this way there is at all times a bottom layer of unfused material including partially dehydrated borate between the upper layer of fused material and the supporting surface, such bottom layer serving to insulate the supporting surface from the excessive heat in the fusion zone and also to protect the same from the chemical action of the fused material. The width of the deposited bed of material is such that it does not contact the side walls of the furnace at any point, so it will be seen that I am able to fuse a material such as sodium tetraborate without the deteriorating effects which ordinarily result when a hot molten material of this character contacts with the furnace walls.

As has been previously pointed out, it is one object of this invention to produce a fused sodium tetraborate which is harder than the so-called calcined borax but is much more friable than borax glass. In accomplishing this object it is important that the process include the steps of fusing the borax in a manner such that a layer or bed of fused material is formed on top of a bed of unfused material a portion or all of which is partially dehydrated and then cooling the layer of fused borax while in contact with said supporting bed of unfused material. In this latter connection I have discovered that the rate of cooling is not a critical factor governing the character of the product and that satisfactory results, particularly insofar as the product is concerned, may be obtained either with the use of forced cooling, such as is obtained by blowing air on the material, or by permitting the material to cool gradually while in contact with the unfused material. In a continuous process, particularly when practiced with apparatus of the type shown herein, however, I consider it preferable to employ some means of forced cooling since the space consumed in the path of travel between the point of egress from the furnace and the point of removal from the conveyor is thereby greatly reduced.

Due to the difficulty of effecting a complete separation of the fused material from the unfused or merely calcined material during its removal from the traveling surface, I consider it a feature of this invention that another step may be introduced in the process for separating the fused material from the calcined or unfused material. For effecting this purpose, I take advantage of the difference in physical characteristics between these two materials. As is well known to those familiar with the art, calcined borax is an extremely soft and easily powdered substance, whereas the fused borax produced in the operations above described, is of a much harder character, and to effect the separation of these two materials I propose to pass them through a screening device such as a revolving Trommel screen, the hard particles of fused sodium borate being effective to pulverize the calcined and partially fused material so that it falls through the screen and can be carried back to the traveling surface for further treatment.

With regard to the removal of the fused material, it is a feature of this invention that I provide means for removing only the upper layer of material which is made up almost entirely of fused sodium borate. This leaves a bottom layer of unfused material upon which another top layer can be applied from the feed hopper.

One preferred form of apparatus, which is adapted for use in practicing the process outlined above, is illustrated more or less diagrammatically in Fig. 1, where reference numeral 11 indicates a revolving table member adapted to receive material to be fused from a hopper 12. The material is deposited upon the table 11 as it revolves in an annular bed generally indicated by reference numeral 13, and such bed of material is carried through a furnace indicated by reference number 14, emerging with its upper layer in a fused condition as described above. In the form illustrated the material passes through an airstream from a blower 15 which rapidly cools and solidifies the same and the rotation of the table carries the material past a scraping device generally indicated by reference numeral 16 whereby it is delivered into a Trommel screen 17 for effecting the separation of the fused from the unfused material. The unfused material is returned to the hopper 12 by means of any suitable conveyor or elevator mechanism, and fresh unfused material is delivered to the hopper 12 from a main supply hopper generally indicated by reference number 18.

As was pointed out above, the speed of travel of the table or supporting surface 11 and the temperature maintained in the furnace 14 are controlled so that an upper layer only of the bed of material is fused by passing through the furnace. These factors, of course, are dependent upon the character of the material to be fused.

It will be observed that the depth of the bed of material depends entirely upon the position of the feed hopper 12 with respect to the traveling surface and the angle of repose of the material fed through the hopper, so that when the proper position of the hopper is once determined the rate of feed material onto the traveling surface is automatically controlled to obtain the desired depth of material.

Figure 2:
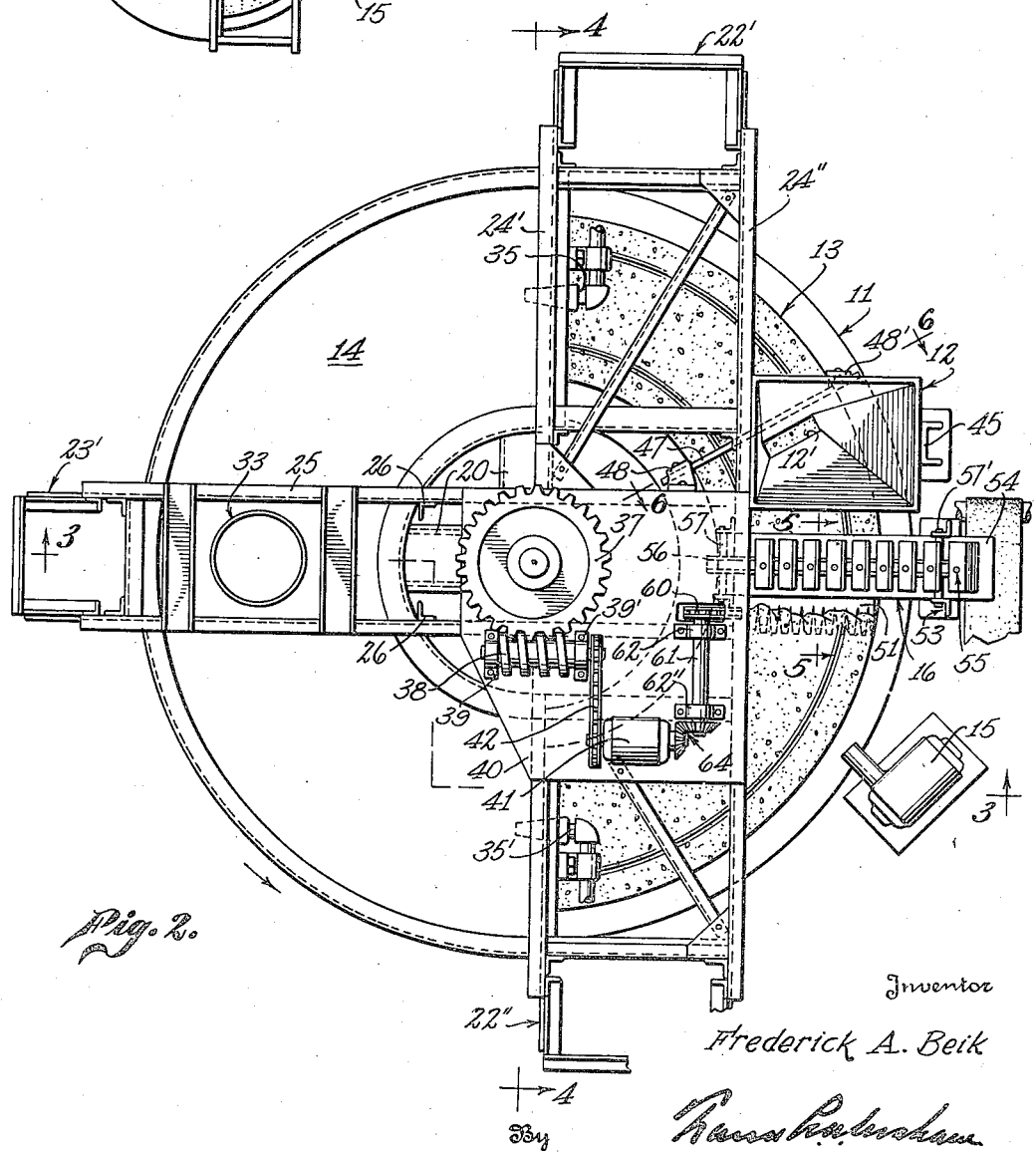
Fig. 2 is an enlarged plan view showing one preferred form of fusing apparatus contemplated by this invention.
Figure 3:
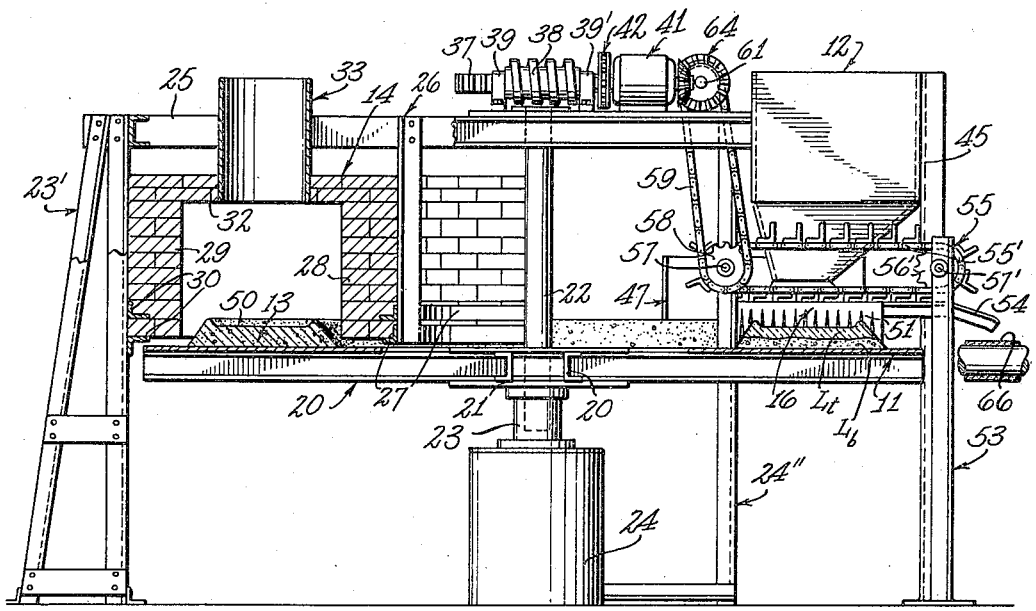
Fig. 3 is a sectional elevation which may be considered as having been taken on the line 3—3 of Fig. 2.
Figure 6:
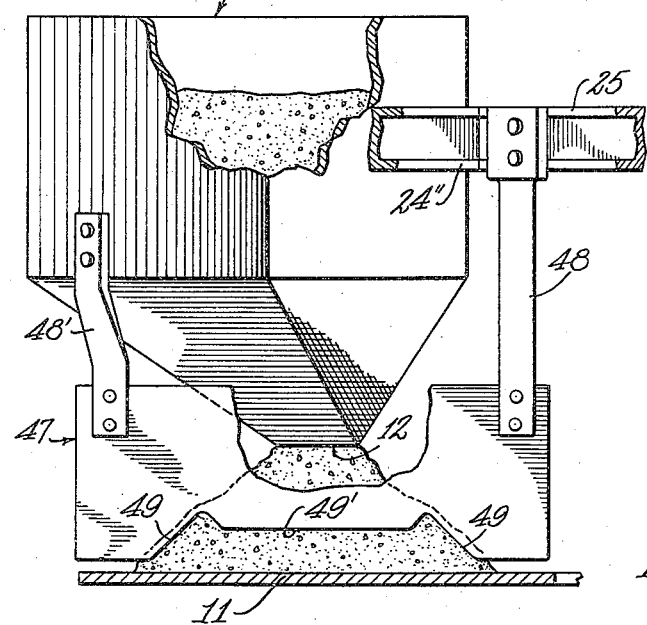
Fig. 6 is a fragmentary elevation taken in the plane represented by the line 6—6 of Fig. 2.

Referring now to Figs. 2 and 6, inclusive, for a more detailed description of the apparatus, it will be observed that the traveling surface or table member 11 is made up of a plurality of radial channel members generally indicated by reference numeral 20 which are supported in a hub member 21 on a vertical shaft 22. The shaft 22 has its lower end supported in a thrust bearing 23 which in turn is carried by a suitable foundation member 24. The radial channel members 20 carry on their upper surfaces an annular plate or table member which is indicated by reference numeral 11 and which provides the traveling surface for the reception of the material to be fused.

Mounted at a substantial distance above the table member 11 on the upper ends of vertical standards 22', 22'' and 23', I provide what may be termed a horizontal frame structure which is made up of members 24' and 24'' interposed between the standards 22', 22'' and a frame section 25 which extends from the vertical standard 23' to the mid-portion of the frame section composed of members 24' and 24''.

This horizontal frame structure is provided with hangers generally indicated by reference numeral 26 which in turn are provided with angle members 27 adapted to support the inner wall 28 of the furnace 14. The outer wall 29 of the furnace 14 is supported by angle members 30 which are mounted on the vertical standards 22', 22'' and 23'. It will be observed that the furnace 14 is arcuate in shape and has an open bottom, being formed so as to cover the path traversed by the bed of material which is deposited upon the table member. The table member it will be observed forms the bottom for the furnace, and the top of the furnace is formed by an arch 32 which is supported between the two arcuate side walls. The mid-portion of the arcuate furnace is provided with a stack 33, and, for the purpose of effecting maximum heat economy, the products of combustion from the stack 33 may be led to a suitable dryer or calciner (not shown) for pre-heating or calcining the material to be ultimately fused in the furnace. Burners generally indicated by reference numerals 35 and 35' are provided in the two ends of the furnace 14 for the purpose of supplying heat to the same.

For the purpose of effecting rotation to the table member I provide the upper end of the shaft 22 with a worm gear 37 which is in engagement with a worm 38 mounted between suitable bearings 39 and 39' on a platform 40 which in turn is supported by the horizontal frame structure made up of members 24, 24' and 25. This horizontal frame structure also carries a source of power such as an electric motor 41 which in turn operates the worm 38 through the medium of suitable gears or, as shown, a sprocket chain mechanism indicated at 42.

The feed hopper 12 which is used to deliver the material to be fused in a bed upon the traveling surface, or the top plate 11 of the table member, is shown as being supported between the member 24' and a post or standard 45 situated outside of the table member. This hopper may be of any desired construction and is shown as being formed so that the discharge opening 12' is on a radius of the revolving table. In other words, the discharge opening is formed so that it is normal to the direction of travel of the table.

Figure 4:
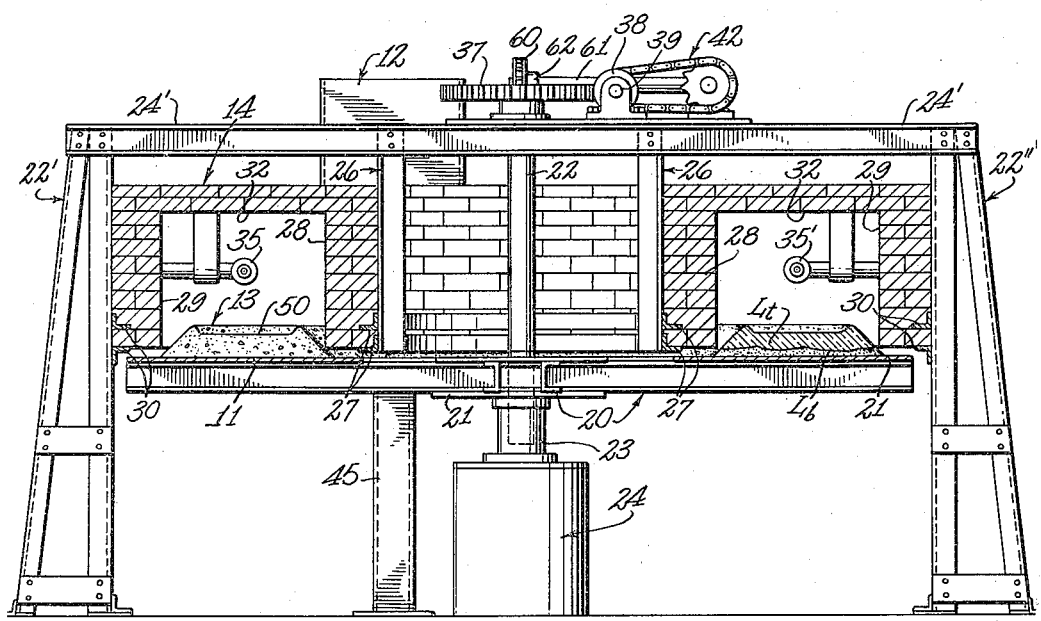
Fig. 4 is a sectional elevation taken on the line 4—4 of Fig. 2.

As has been previously pointed out it is a feature of this invention that the depth of the bed of material is controlled by the position of the hopper and the angle of repose of the material. I consider it an important feature of this invention, however, in order to prevent the material as it fuses from running off of the plate, to shape or form the bed of material so that its top surface is provided with a trough. This is done by providing a spreader plate, indicated by reference numeral 47, which is shown as being supported by brackets 48 and 48' mounted on the hopper and the horizontal frame structure 24', respectively. This spreader plate 47 is positioned so as to engage and spread the bed of material deposited from the hopper as the table rotates, and its lower edge is cut away as indicated by reference numeral 49, so as to leave an underhanging lip 49' which is effective to form a trough 50 (see Fig. 4) in the top of the bed of material.

Figure 5:
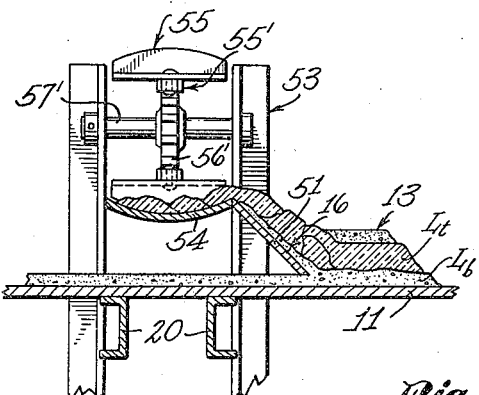
Fig. 5 is a fragmentary section taken in the plane represented by the line 5—5 of Fig. 2.

As has been previously pointed out, the speed of rotation of the table member and the temperature of the furnace are controlled so that the upper layer only of the bed of material is fused during its passage through the furnace. As the material emerges from the furnace, below the burner 35', therefore, it is composed of two layers, a top layer ($Lt$) of fused material and a bottom protecting and insulating layer ($Lb$) of unfused material a portion or all of which is partially dehydrated. (See Figs. 5 and 4.) It is preferable with the form of apparatus illustrated, in order to efficiently effect the removal of the fused material from the table, to at least partially cool the same so as to solidify it before attempting to effect such removal. For this purpose I subject the material to a blast of cooling air which, as has been previously pointed out, may have its source in a blower generally indicated by reference numeral 15.

With regard to the means 16, which is provided for the purpose of removing the material from the traveling surface, it will be understood that various types of mechanism may be employed for this purpose. In order to efficiently separate the fused from the unfused material, and further to insure a protective layer of unfused material on the plate at all times, I prefer to remove only that portion of the bed of material which has been fused. For the purpose of effecting this separation of the two layers $Lt$ and $Lb$ I form the scraping or removing means 16 in the nature of a downwardly inclined scraping plate or blade 51 which may be supported between posts or standards generally indicated by reference numeral 53. I have found that for most efficient operation the plate 51 should be serrated so that it is in the nature of a forwardly inclined rake, and as the table with its bed of material travels beneath the member 16, the rake, having its lower edge positioned a slight distance above the top of the table, is effective to remove the fused layer $Lt$ of material in the manner illustrated in Fig. 5. This fused material rides up over the inclined plate 51 and falls into a trough 54 which may be made integrally with or suitably associated with the inclined plate. Material falling into this trough member 54 is removed therefrom in any suitable manner such as by means of a traveling chain and drag link mechanism generally indicated by numeral 55. The chain 55' in this drag link mechanism rides over sprocket wheels 56 and 56' which are carried by shafts 57 and 57'. The shaft 57 is provided with a sprocket gear 58 which engages another chain 59, such chain riding over a sprocket 60 which in turn is mounted on a shaft 61 carried by bearings 62 and 62' on the platform 40. The shaft 61 is shown as being driven through a suitable gear mechanism 64 from the motor 41. The material discharged from the trough 54 may be delivered onto a traveling conveyor 66 whereby it may be conducted to the Trommel screen for the purpose hereinabove referred to.

It will be apparent from the foregoing description that the method and apparatus contemplated by this invention provide means for efficiently effecting the fusion of a material such as sodium borate in a manner such that the furnace and the surface supporting such material is entirely protected against reaction with the material during its fusion. Furthermore my invention contemplates a method in which the material to be fused is automatically delivered into the fusing apparatus without the exercise of manual control over a feeding mechanism. It will also be apparent that by controlling the speed of the traveling surface and the temperature of the furnace, that various materials may be treated in this way with the corresponding advantages.

The term "unfused" as used in the specification and claims refers to a borate material a portion or all of which is partially dehydrated and which has not been melted. The term "fused" as used in the specification and claims refers to the recognized fusion or melting point of borate material which for instance in the case of borax is approximately 740° C.

It will be understood that while I have herein described and illustrated one preferred method of procedure contemplated by this invention and one preferred apparatus for practising the process, the invention is not limited to the precise construction or the precise procedure described above but includes within its scope whatever changes fairly come within the spirit of the appended claims.

I claim as my invention:

1. The method of producing fused borates which includes: depositing a bed of material including unfused hydrated borates onto a traveling surface; passing said bed of material through a furnace to fuse only an upper layer thereof; cooling the fused layer of said bed of material to solidify the same while it is in contact with the unfused bottom layer which includes partially dehydrated borate; and removing the fused layer from the top of said bed thereby leaving a layer of unfused material on said traveling surface.

2. The method of producing fused borates which includes: depositing a bed of material including unfused hydrated borates onto a traveling surface; passing said bed of material through a furnace to fuse only an upper layer thereof; rapidly cooling the fused layer of said bed of material to solidify the same while it is in contact with the unfused bottom layer which includes partially dehydrated borates; removing the fused layer from the top of said bed thereby leaving a layer of unfused material on said traveling surface; screening the fused material thus removed to separate unfused material therefrom; and depositing this last mentioned unfused material with fresh hydrated unfused material onto the layer of unfused material left on said traveling surface.

3. The method of fusing borate material which includes; depositing a bed of material including unfused hydrated borates onto a traveling surface; heating said bed of material at a point in its travel so as to fuse only an upper layer thereof, thereby leaving a protective layer of unfused material which includes partially dehydrated borates on the traveling surface; cooling the layer of fused material at another point in its path of travel to solidify the same; and then removing the layer of fused material from the layer of unfused material.

4. In a process for fusing a borate material the steps of: depositing a bed of borate material including unfused hydrated borates onto a traveling supporting surface; passing said supporting surface with said bed of material through a heating zone; controlling the speed of travel of said supporting surface and the temperature of said heating zone so as to fuse only an upper layer of said bed of material during its passage through said heating zone leaving a bed of material including partially dehydrated borates; and then cooling said upper layer of fused material while it is resting on a bottom layer of said unfused material.

5. The method of fusing a borate material which includes; depositing a bed of material including unfused hydrated borate material onto a traveling supporting surface; passing said supporting surface with said bed of material through a heating zone; controlling the speed of travel of said supporting surface and the temperature of said heating zone so as to fuse only an upper layer of said bed of material leaving a bed of material including partially dehydrated borates; rapidly cooling said upper layer of fused material to solidify the same after it emerges from said heating zone and while it is in contact with said unfused layer; and separating the solidified upper layer of fused material from the bottom layer of unfused material.

6. The method of fusing a borate material which includes: depositing a bed of material including unfused hydrated borates onto a traveling supporting surface; passing said supporting surface with said bed of material through a heating zone; controlling the speed of travel of said supporting surface and the temperature of said heating zone so as to fuse only an upper layer of said bed of material leaving a bed of material including partially dehydrated borate; cooling said fused material to solidify the same after it emerges from said heating zone and while it is in contact with said unfused layer; separating the fused material from the unfused material; and returning the unfused material to said heating zone.

7. The method of fusing a borate material which includes: depositing a bed of material including unfused dehydrated borates material onto a traveling supporting surface; passing said supporting surface with said bed of material through a heating zone; controlling the speed of travel of said supporting surface and the temperature of said heating zone so as to fuse only an upper layer of said bed of material leaving a bed of material including partially dehydrated borates; blowing air on said material after it emerges from said heating zone to rapidly cool and solidify said upper layer of fused material; and separating said upper layer of fused material from said bottom layer of unfused material.

8. The method of producing a fused borate material which includes: fusing an upper layer of a bed of material including unfused hydrated borates; rapidly cooling said fused layer to solidify the same while it is in contact with an unfused bottom layer of said bed of material which includes partially dehydrated borates; and then separating the upper layer of solidified fused material from the bottom layer of unfused material.

9. The method of producing a fused borate material or the like which includes: fusing an upper layer of a bed of unfused material including hydrated borates; cooling said fused layer to solidify the same while it is in contact with an unfused bottom layer of said bed of material which includes partially dehydrated borates; and then separating the upper layer of solidified fused material from the bottom layer of unfused material.

10. The method of producing a fused borate material or the like which includes: fusing an upper layer of a bed of unfused material including hydrated borates; gradually cooling said fused layer to solidify the same while it is in contact with an unfused bottom layer of said bed of material which includes partially dehydrated borates; and then separating the upper layer of solidified fused material from the bottom layer of unfused material.

11. The method of producing a fused borate material or the like which includes: fusing an upper layer of a bed of unfused material including hydrated borates to produce a layer of fused material having greater hardness when solidified than the unfused material; cooling the fused layer to solidify the same while it is in contact with an unfused bottom layer of material which includes partially dehydrated borates; removing the fused layer; and agitating the removed material to pulverize and separate any unfused material admixed therewith.

12. The method of producing a fused borate material or the like, which includes: fusing an upper layer of a bed of unfused material including hydrated borates to produce a layer of fused material having greater hardness when solidified than the unfused material; cooling the fused layer to solidify the same while it is in contact with an unfused bottom layer of material which includes partially dehydrated borates; removing the fused layer; agitating the removed material to pulverize and separate any unfused material admixed therewith; and returning the separated unfused material to said bed of unfused material.

FREDERICK A. BEIK.